Aug. 4, 1970  F. E. BUSCHBOM  3,522,971
DRIVE WHEEL

Original Filed Nov. 15, 1967  3 Sheets-Sheet 1

INVENTOR.
FLOYD E. BUSCHBOM
BY Bird, Braddock & Bartz
ATTORNEYS

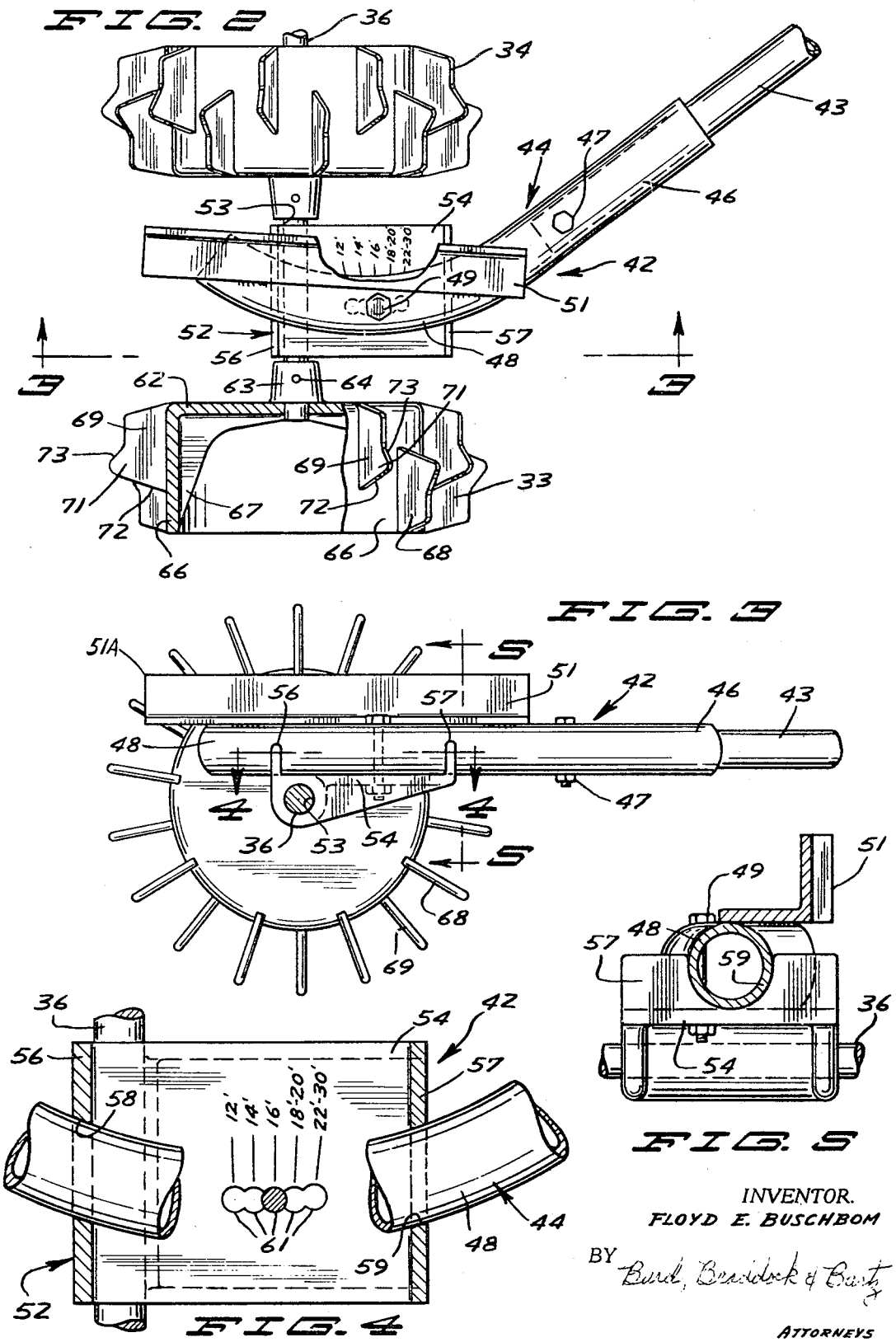

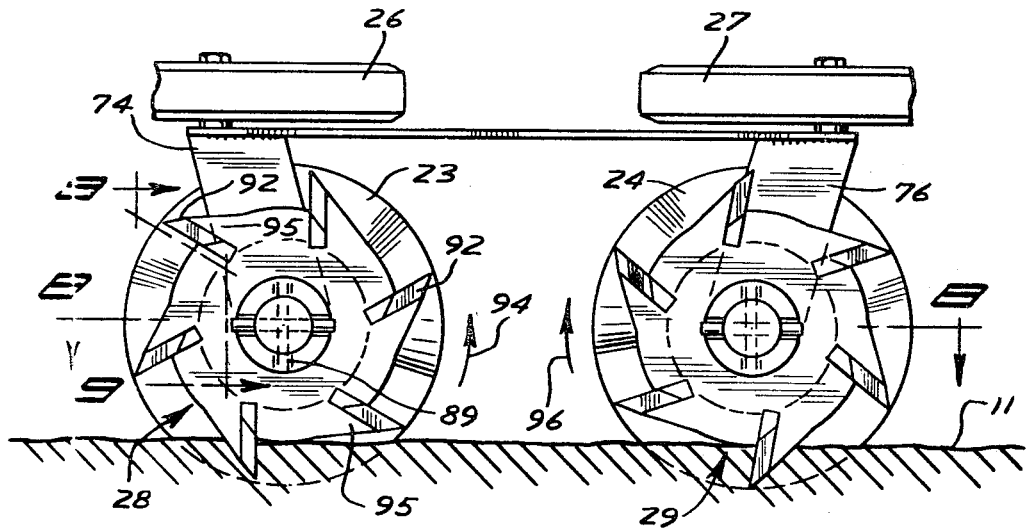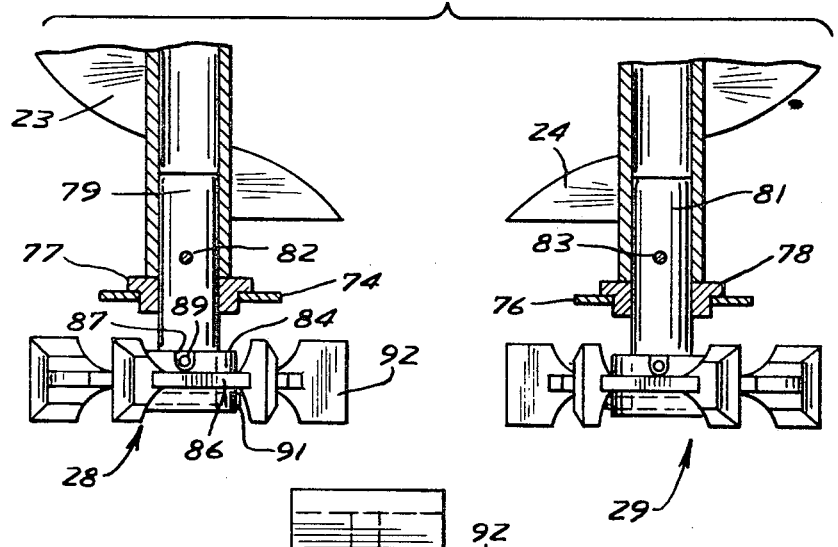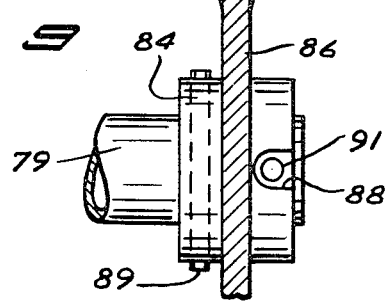

United States Patent Office 3,522,971
Patented Aug. 4, 1970

3,522,971
DRIVE WHEEL
Floyd E. Buschbom, Long Lake, Minn., assignor to Van Dale Corporation, Long Lake, Minn., a corporation of Minnesota
Original application Nov. 15, 1967, Ser. No. 683,273, now Patent No. 3,460,688. Divided and this application Dec. 30, 1968, Ser. No. 787,774
Int. Cl. B60b 15/02
U.S. Cl. 301—43      9 Claims

ABSTRACT OF THE DISCLOSURE

A top unloading silo unloader having a pair of drive hubs for moving a collector arm around the silo. A tie rod extended from the outer end of the collector arm is attached to the drive shaft between the drive hubs by a connector assembly having an arcuate arm cooperating with a guide having a pair of spaced grooves receiving the arm to hold the drive hubs in an adjusted angular position with reference to the collector arm. Each of the drive hubs has circumferentially spaced oppositely directed pairs of radial lugs. Removably and reversibly mounted on the outer ends of the collector arm augers are wall cleaners having forwardly projected teeth.

CROSS-REFERENCE TO RELATED APPLICATION

This application is a division of U.S. application Ser. No. 683,273 filed Nov. 15, 1967, now Pat. No. 3,460,688.

BACKGROUND OF INVENTION

Top unloading silo unloaders are equipped with drive wheels for moving the silage collector arm of the unloader around the silo. These wheels are located adjacent the rearward side, the forward side, or adjacent both sides of the collector arm and are driven from a power transmission operated with the silo unloader motor. The position of the drive wheels relative to the collector arm determines the force of the engagement of the collector arm wall engaging wheels with the silo wall as well as the force moving the collector arm around the silo. A sufficient force on the collector arm must be created with a minimum of side slip of the drive wheel to permit effective operation of the unloader. The drive hubs in U.S. Pats. No. 3,139,995 and No. 3,169,798 for the top unloading silo unloaders are adjustable with reference to the unloader to minimize the side slip and vary the pressure between the collector arm wall engaging wheel.

Silo unloaders are also provided with wall cleaners having upwardly directed teeth mounted on the outer ends of the collector arm augers. Pats. No. 2,888,253 and No. 3,138,268 show examples of this type of wall cleaner. These wall cleaners are fixedly mounted on a short stub shaft connected to the ends of the collector arm augers. They are not removable or reversibly mounted to extend the effective life of the wall cleaner.

The silo unloader drive of the present invention overcomes the disadvantages of the prior silo unloader drives by providing self-cleaning drive wheels attached to an adjustable connector assembly used to change the angle of the drive hub wheels relative to the collector arm. The connector assembly enables the unloader to accommodate different sized silos and insure efficient wall pressure on the outboard wall engaging wheels. At the same time, the drive wheels generate a force sufficient to drive the silo unloader collector arm around the silo. The collector arm has removable and reversible wall cleaners.

SUMMARY OF INVENTION

The invention relates to a self-cleaning drive wheel means usable with a silo unloader and other implements. The drive wheel means has a generally circular flange supporting outwardly extended circumferentially spaced generally transverse lugs. A plurality of the lugs have a length less than the axial length of the flange. Adjacent lugs project in opposite directions from the center area of the flange to provide a self-cleaning arrangement of lugs operable in both loose and hard material, as silage. Each lug has an outwardly directed extension penetrating hard material to provide a drive grip on the hard material for the wheel means.

Figure 1:
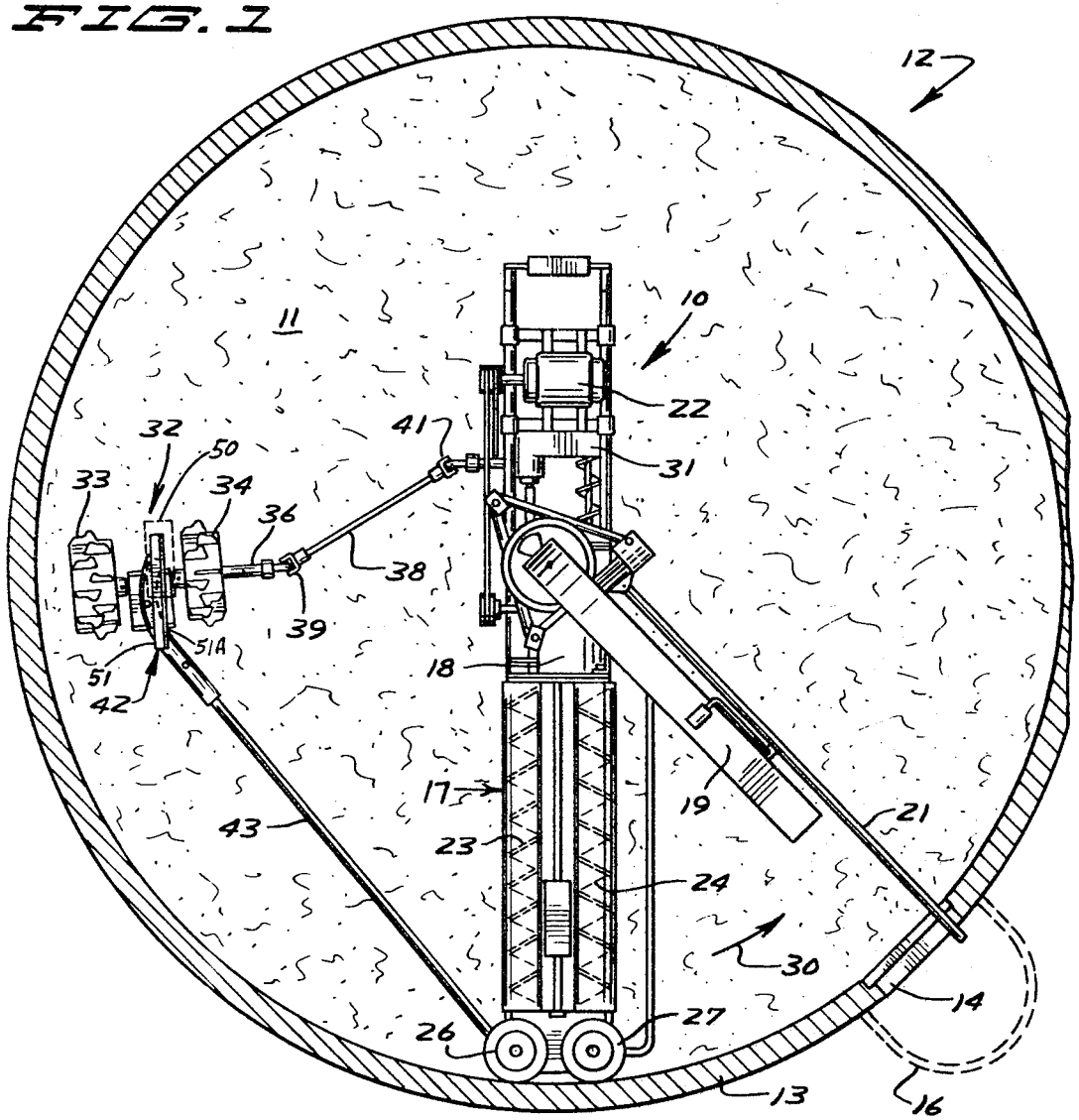
Figure 6:
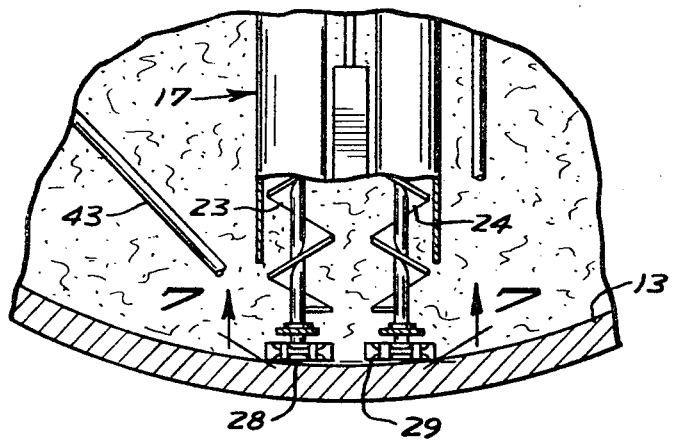

In the drawings:
FIG. 1 is a plan view of a silo unloader of the invention located in a tower silo shown in section;
FIG. 2 is an enlarged plan view partly sectional of the drive hubs and tie bar connector of FIG. 1;
FIG. 3 is an enlarge sectional view taken along the line 3—3 of FIG. 1;
FIG. 4 is an enlarged sectional view taken along the line 4—4 of FIG. 3;
FIG. 5 is a sectional view taken along the line 5—5 of FIG. 3;
FIG. 6 is a plan view of the outer end of the collector arm with parts broken away to show the wall cleaners;
FIG. 7 is an enlarged end view of the collector arm taken along the line 7—7 of FIG. 6;
FIG. 8 is a sectional view taken along the line 8—8 of FIG. 7; and
FIG. 9 is a sectional view taken along the line 9—9 of FIG. 7.

Referring to the drawings, there is shown in FIG. 1, a silo unloader indicated generally at 10 positioned on top of ensilage 11 stored in a tower silo 12. The silo unloader 10 continuously moves around silo wall 13 collecting ensilage and discharging the collected ensilage through the silo door 14 into the upright chute 16.

Silo unloader 10 has an elongated collector arm 17 secured at its inner end to an impeller 18 for receiving the silage and discharging the ensilage into a discharge chute 19 operative to direct the ensilage through door 14. A torque arm 21 mounted to the center portion of the silo unloader extends through the door to maintain the chute 19 in alignment with the door. Silo unloader 10 has a motor 22 driving a transmission 31 used to turn a pair of augers 23 and 24. Rotatably mounted on the outer end of collector arm 17 are a pair of spaced horizontal wall engaging wheels 26 and 27 operative to space wall cleaners or chipper wheels 28 and 29, shown in FIG. 6, a short distance from silo wall 13.

Transmission 31 is also used to transmit power to drive means indicated generally at 32. In use, drive means 32 angularly moves the collector arm 17 around the silo wall 13 in the direction of the arrow 30 and maintains the wheels 26 and 27 in engagement with the silo wall 13. Drive means 32 comprises a pair of hubs or wheels 33 and 34 mounted on a driven shaft 36. Shaft 36 is drivably connected with the transmission 31, with a shaft 38 and universal joints 39 and 41. On operation of motor 22, transmission 31 drives augers 23 and 24 in opposite directions and concurrently drives the wheels 33 and 34 moving collector arm 17 around the silo.

Located between the wheels 33 and 34 is a connector assembly indicated generally at 42 secured to a forwardly projected tie bar 43. The forward end of tie bar 43 is connected to the outer end of collector 17 to transmit the force of the drive means to the collector arm. As shown in FIG. 2, the connector assembly 42 comprises a curved arm 44 having a first straight end 46 telescoped into the end of tie bar 43 and secured thereto with a transverse bolt 47. Leading from the first end 46 is an opposite or second curved end 48 having a single upright hole accommodating a bolt 49. A brace 51 secured to the curved end 48 reinforces the arm 44. Located below arm 44 is a guide member indicated generally at 52 having a horizontal bore 53 for rotatably accommodating the shaft 36 whereby the guide member 52 functions as a bearing for shaft 36. Guide member 52 has a flat generally horizontal base 54 and upright front and rear flanges 56 and 57. As shown in FIG. 4, flanges 56 and 57 have grooves or cutouts 58 and 59 along an arc which is complementary to the curvature of the second end 48. FIG. 5 shows the groove 59 as having a generally semicircular shape. Groove 58 is similar to the groove 59. Grooves 58 and 59 serve as guides for the curved end 48 and direct the rotation of the guide member 52 and the shaft 36 carrying wheels 33 and 34 about an upright axis. The bolt 49 projects through one of a plurality of adjacent holes 61 in the mid-portion of the base 54 to secure the arm 44 to the base. Holes 61 are in a side-by-side relationship along the arc corresponding to the arcuate curvature of the end 48. Base 54 carries indicia 12, 14, 16, 18-20, and 22-30 for selected holes to indicate the position of bolt 49 for different diameter silos. On the assembly of the silo unloader in the silo, bolt 49 merely need be inserted in the proper size hole 61 according to the dimension of the silo. Additional adjustments are not necessary as the angular relationship of the axis of rotation of the drive hubs 33 and 34 relative to the collector arm of the silo unloader has been predetermined with the diameters of the various size silos. In the smaller diameter silos, the axis of rotation of the hubs 33 and 34 approaches a normal position relative to the collector arm 17. Conversely as the diameter of the silo increases, the axis of rotation of the drive wheels 33 and 34 moves toward the collector arm 17 and forms an acute angle with the radial extent of the collector arm.

Brace 51 is an elongated angle member having a mount shown as an upright flange or rib 51A, extended between wheels 33 and 34. As shown in broken lines in FIG. 1, a weight 50 is removably mounted on rib 51A to increase the traction of wheels 33 and 34. Weight 50 is similar to the counterweight on collector arm 17 shown in detail in U.S. Pat. No. 3,232,456. Weight 50 has an elongated groove or slot (not shown) for receiving the rib 51A and a set screw (not shown) for securing the weight to the rib. This makes the weight readily removable and available for use on the collector arm 17 or inner end of the silo unloader frame. The rib 51A is also used as a place to store weights not used on other elements of the unloader.

Returning to FIG. 2, wheels 33 and 34 are axially spaced from each other on the driven shaft 36 with the connector assembly 42 located between the wheels. Wheels 33 and 34 are identical in the structure and operate as a pair to drive the collector arm 17 around the silo. The following description is limited to the wheel 33.

Wheel 33 is a cast metal integral member comprising a base or disc 62 carrying an outwardly directed center boss 63 having a bore for receiving the shaft 36. A transverse pin or fastener 64 drivably connects the boss to the shaft 36. Extended axially from the periphery of disc 62 is an axial flange 66 reinforced with the disc by a plurality of circumferentially spaced and inwardly directed ribs 67. Integral with the outer face of the flange 66 are a plurality of circumferentially spaced pairs of lugs 68 and 69. The lugs extend in radial directions with each pair of lugs extended in opposite axial directions. The inner ends of each lug extend across the mid-section of the flange 66 and have outwardly directed triangular extensions 71. The apex of each triangular extension 71 lies along the transverse midplane of the flange 66. The inside edges 72 of the lugs extend downwardly to the flange 66 and has a greater incline than the outer edges 73 which join with the axial top edges of the lugs. The oppositely directed relationship of the pairs of lugs as well as the difference in the slopes of the adjacent edges of the pairs of lugs provides the drive wheels with effective traction as well as self-cleaning characteristics.

Referring to FIGS. 7 and 8, wall cleaners 28 and 29 located below the wall engaging wheels 26 and 27 are secured to the outer ends of the augers 23 and 24 respectively. The silo unloader frame has downwardly projected legs 74 and 76 carrying bearings 77 and 78. Short shafts 79 and 81 rotatably mounted on the bearings 77 and 78 are attached to the augers by pins 82 and 83 respectively. The shafts 79 and 81 project outwardly through the bearings and carry the wall cleaners 28 and 29 respectively. The following description is limited to wall cleaner 28 which is identical with wall cleaner 29.

Wall cleaner 28 has a central cylindrical collar 84 carrying an annular radial disc 86. Opposite sides of collar 84 have diametrical recesses 87 and 88 normally disposed with respect to each other. Referring to FIGS. 8 and 9, pins 89 and 91 projected through transverse holes in the shaft 79 have opposite ends extended into the recesses 87 and 88 to fix the wall cleaner on the shaft 79. Secured to the outer peripheral portion of disc 86 are a plurality of outwardly extended knives 92. Each wall cleaner has six equally spaced forwardly inclined knives. The number of knives may vary with the shape of the disc 86. Each knife lies along a cord of the disc 86 and slopes outwardly and forwardly about 20 degrees from a radial line passing through the base of the knife. The knife has a U-shaped recess 93 in the inner or base end of the knife receiving a peripheral portion of the disc. The disc 86 has outward projected extensions 95 behind each knife to reinforce and hold the knives in their forwardly inclined positions. Referring to FIG. 9, knife 92 has a generally rectangular shape and a width substantially greater than the thickness of disc 86. The opposite sides of the knife 92 are equally spaced from the disc 86 and have linen cutting edges joined with an outer axial cutting edge.

As shown in FIG. 7, the augers and wall cleaners 28 and 29 rotate in opposite directions as indicated by the arrows 94 and 96. The outer ends of the forwardly extended knives 92 as well as the sides of the knives function as cutting edges acting on the ensilage adjacent the silo wall. After considerable use, it is desirable to reverse the wall cleaners. This may be done by removing the outer pin 91 in each of the wall cleaners and exchanging the wall cleaner 28 for the wall cleaner 29. The reversed wall cleaners are secured to the shafts by replacing the pins 91. This reverses the cutting edges of both of the wall cleaners thereby extending the useful life of the wall cleaners.

The embodiments of the invention in which an exclusive property or privilege is claimed are defined as follows:

1. In a silo unloader the improvement of: a driven shaft, drive hub means secured to said driven shaft for rotation therewith, said drive hub means including a wheel having an annular axially extended flange, means for securing the flange to the driven shaft, a plurality of circumferentially spaced oppositely directed pairs of generally transverse flat lugs secured to and projected radially from said flange, each of said lugs having a transverse length less than the axial length of the flange and a radial outwardly projected triangular shaped extension.

2. The silo unloader of claim 1 wherein: the triangular shaped extensions of each lug lie substantially along a plane passing through the transverse mid-section of the flange.

3. The silo unloader of claim 1 wherein: the outer ends of each pair of lugs extend to opposite sides of the flange.

4. A drive wheel comprising: an axially extended generally circular flange, a plurality of pairs of circumferentially spaced outwardly directed generally transverse flat lugs secured to said flange, each of said lugs having a transverse length greater than one-half the axial width of said flange, said length being less than the axial width of said flange, each pair of lugs having one lug extended in one axial direction and one lug extended in the opposite axial direction, and means connected to said flange adapted to mount the wheel on a shaft.

5. The drive wheel of claim 4 wherein: each lug has a flat generally rectangular outline projected in a radial direction.

6. The drive wheel of claim 4 wherein: each lug has an outwardly directed extension.

7. The drive wheel of claim 6 wherein: the extension of each lug lies along the transverse mid-plane of the flange.

8. The drive wheel of claim 4 wherein: each lug has an inside edge and an outside edge, said inside edge extends downwardly to the flange with a greater incline than the outside edge.

9. The drive wheel of claim 1 wherein: each lug has an inside edge and an outside edge, said inside edge extends downwardly to the flange with a greater incline than the outside edge.

References Cited
UNITED STATES PATENTS

| | | |
|---|---|---|
| 1,501,937 | 7/1924 | Benjamin. |
| 1,727,625 | 9/1929 | Zybach. |
| 1,930,615 | 10/1933 | Harris et al. _____ 301—44 |
| 3,331,640 | 7/1967 | Prentice. |

ROBERT G. SHERIDAN, Primary Examiner